Aug. 2, 1960 B. C. SKINNER 2,947,296
VALVE LINKAGE ADJUSTING MECHANISM
Filed Aug. 3, 1959 2 Sheets-Sheet 1

Aug. 2, 1960

B. C. SKINNER 2,947,296

VALVE LINKAGE ADJUSTING MECHANISM

Filed Aug. 3, 1959

United States Patent Office 2,947,296
Patented Aug. 2, 1960

2,947,296

VALVE LINKAGE ADJUSTING MECHANISM

Bronson C. Skinner, Dunedin, Fla., assignor to Brunhilde W. Skinner, Dunedin, Fla.

Filed Aug. 3, 1959, Ser. No. 831,130

10 Claims. (Cl. 123—90)

The invention is concerned with automatically adjustable length compensating means as embodied in valve operating linkages designed particularly for internal combustion engines, the length compensating means of the general type involved also being commonly referred to as automatic tappets. The adjustable means as particularly illustrated herein is of the purely mechanical type but the principles of the invention are also applicable to the hydraulic type.

The general features of the mechanical type to which the present invention is applied herein are illustrated and described in my earlier Patents Nos. 2,755,784, issued July 24, 1956, and 2,862,485, issued December 2, 1958. As described in detail particularly in the latter it is the practice to provide these length compensating means or automatic tappets with a predetermined clearance or lift loss particularly where the tappets are intended for replacements for originally solid mechanical tappets in existing engines as originally designed. The clearance provided is normally in the range of .006 to .028 inch dependent upon circumstances. In my above noted prior patents the lift loss or clearance is provided by spring washers. Also reference is made to the prior patents to Holmes No. 2,066,976, issued January 5, 1937, and Engemann No. 2,633,112, issued March 31, 1953, showing the use of spring washer means to provide the desired clearance. In general it may be noted here that these spring washers are of a strength and character such that they expand to take up and provide the desired clearance but have insufficient strength to overcome the main valve spring, and as thrust is applied to the linkage the clearance spring means collapses initially before the main valve begins to rise from the seat. The clearance is designed to be present and effective particularly when the engine is cold or at least cool under idling conditions in order to provide space for expansion due to heating when the engine is operated at higher speeds and under hotter conditions and thereby avoid cracking open the main valves or preventing them from seating properly during the periods in the cycle when they should be fully closed. In association with the clearance each engine cam is provided with an opening and closing ramp as explained and illustrated in my aforementioned Patent No. 2,862,485. It is usual to make the lift loss or clearance approximately equal to the total lift of the ramps less a small amount which is allowed for elasticity of the valve train. The purpose is to avoid opening of the valve at the beginning of the cam opening ramp and to permit closing of the valve near the beginning of the radial decrease in the cam comprising the closing ramp and thereby decrease the top overlap in the working conditions of the engine. Top overlap is the condition where both intake and exhaust valves are open. The desirability of keeping the top overlap to a minimum is described fully in my said Patent No. 2,862,485 and is illustrated in Figs. 8a, 8b and 8c thereof, to which reference is made. In general, however, it is pointed out here that there is a strong vacuum in the engine intake manifold and when both the intake and exhaust valves are open at the same time exhaust gases are drawn into the intake manifold and mixed with the fresh exhaust gases and continue on into other cylinders which are receiving a charge.

A type of means heretofore employed for providing the desired clearance or lift loss has been in the form of spring washer means as shown in the patents above mentioned and although they have been used successfully in some cases, as in the form shown in my aforementioned Patent No. 2,862,485, such devices are subject to considerable variation in their shape and effective thickness and require considerable skill and experience in obtaining the proper setting and furthermore they are subject to wear and corresponding change in the effective clearance. Also the torsion spring employed in the prior art devices for relatively rotating the screw and nut creates at light pressure upon the clearance washer means, compressing them an appreciable amount since in such prior constructions the clearance spring washers are designed to be substantially relaxed in the fully closed position of the valve. The modifying effect of the torsion spring furthermore is variable with time and changing conditions such as when the screw becomes more polished and there is less friction restricting the action of the torsion.

In connection with the above it is pointed out for best engine operation the amount of clearance is critical and variations of two or three thousandths of an inch produce quite substantial effects on the operation of the engine.

The present invention comprises an arrangement which is substantially unaffected by wear and does not require frequent adjustments. It includes in combination features whereby the clearance spring means is initially set in a partially compressed and pre-stressed condition sufficient that the spring is unaffected by minor forces such as any pressure created by the torsion spring, and the clearance is positively determined by stop means limiting the expansion of the clearance spring. The stop means is adjustable and may be accurately set. Such setting may be made precisely in an easy and accurate manner in the assembly of the tappet by relatively unskilled persons. Thereafter the setting is substantially unaffected by wear or variations in the operation of the automatic periodic adjusting means.

Other advantages and objects of the invention will be made apparent from the description to follow and the disclosures in the drawings of typical constructions embodying the principles of the invention. Accordingly reference should be had to the following detailed description taken in connection with the drawings, in which.

Figure 1:
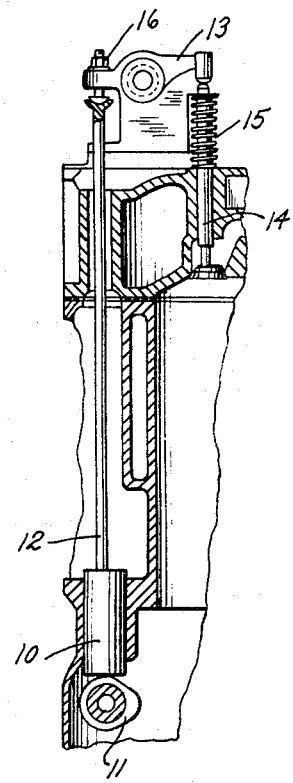
Fig. 1 is a fragmentary view of an internal combustion engine showing a typical arrangement of a poppet valve and operating mechanism therefor embodying a length compensating mechanism of the type illustrated more fully in the other figures.

Fig. 1 illustrates a typical arrangement of a valve operating linkage mechanism in an internal combustion engine. As is evident from the patents heretofore cited the automatic tappet may be located at various points in the system and be utilized in different types of engines. In some cases the tappet will operate directly on the stem of the valve and in others through an overhead lever arm as shown in Fig. 1. In the illustration of Fig. 1 the automatic tappet 10 is adapted to be engaged directly by the cam 11, and operating through the push rod 12 and the overhead rocker arm 13, to depress and open the poppet valve 14 normally held seated by a comparatively strong coil spring 15 in the usual manner. A major adjusting means for varying the length of the linkage is embodied at 16 in accordance with the conventional constructions.

Figure 2:
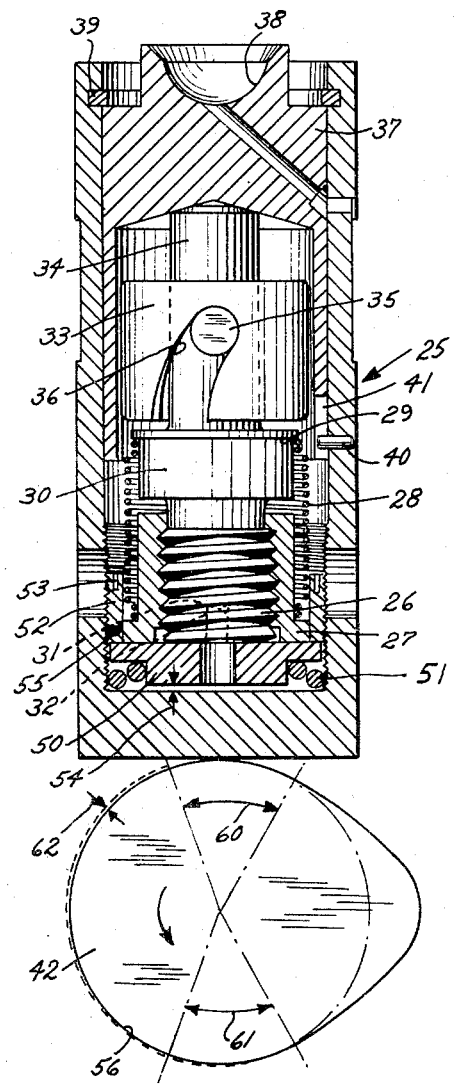
Fig. 2 is a vertical section on an enlarged scale showing one form of automatic tappet or length compensating mechanism embodying the principles of the invention.

The principles of the invention may be embodied in different types of automatic tappets either of the hydraulic or mechanical type. Fig. 2 illustrates a form of tappet of the mechanical class embodying an inertia weight and torsion spring for automatically adjusting the length of the linkage and taking up slack therein, this type of tappet in general being well known in the prior art and shown for example in my previous Patent No. 2,862,485. The specific form of Fig. 2 includes an outer hollow shell or body 25 in which is mounted a subassembly including a screw element 26 and a nut 27 connected by a torsion coil spring 28, the upper end of the spring having a part 29 turned inwardly and engaged in an opening in the head 30 of the screw 26. The lower portion of the spring encircles the nut 27 and has a lower end part 31 turned radially inward and engaged in a notch 32 in the nut 27. A weight or inertia member 33 is slidably and rotatably mounted on the upper stem part 34 of the screw, the stem 34 having a radial pin 35 engaged in a spiral slot 36 of the weight 33. Seated over the upper end of the screw stem 34 is a hollow sleeve or cap member 37 having a herispherical or similarly shaped depression 38 in its upper surface adapted to receive the valve stem or push rod such as the push rod 12 shown in Fig. 1. Upward sliding movement of the sleeve 37 relative to the casing 25 is limited by a spring key 39 mounted in a groove in the interior surface of the shell 25. The sleeve 37 is maintained against relative rotation within the shell 25 by means of a pin 40 in the shell projecting into the slot 41 in the skirt portion of the sleeve 37. With the cap or sleeve member 37 restrained against rotation relative to the shell 25 any rotation of the tappet assembly under the influence of the cam 42 wiping across the end face of the shell is prevented from affecting the independent rotation of the threaded members 26 and 27.

The general features of the tappet construction thus far described are somewhat conventional and may be varied considerably as to detail. The important and novel feature of the construction concerning the clearance or lift loss means, however, will now be described in connection with Fig. 2. Mounted within the casing below the screw 26 is a floating cylindrical cap or thrust member 50 urged upwardly by a spring means shown in the present case as a coil spring 51. The extent of the upward movement of the cap member 50 is determined by the stop sleeve 52 having a screw-threaded engagement with the inner surface of the shell 25. Suitable means may be provided for rotating and setting the stop sleeve member 52 as for example by use of a spanner wrench having pins adapted to engage in holes 53 in the sleeve 52. The setting of the sleeve 52 determines the clearance space between the bottom of the cap member 50 and the bottom end wall of the shell 25 indicated in Fig. 2 at 54. As will be further described in more detail, the amount of clearance and the setting of the sleeve 52 are critical and once the adjustment is made it should be free of disturbance or change in the operation of the tappet. Accordingly means must be provided for locking the member 52 in the adjusted position. This may be done in various ways such as by the application of a rivet or set screw or by spot welding indicated generally at 55 which may be accomplished by placing an electrode on the inside.

The automatic operation of the inertia mechanism including the weight 33 is well understood in the art but will be briefly described here. After the rotary cam 42 has lifted the tappet unit of Fig. 2 and the center of the cam lobe has passed the end face of the tappet the latter will move down until it reaches the base circle 56 as the cam continues to rotate. During such motion the inertia weight 33 is in an uppermost position with the pin 35 near the lower end or mouth of the helical slot 36. The downward motion of the tappet will abruptly cease but the inertia member 33 will continue to move downwardly until the end of the helical slot 36 engages against the pin 35 exerting a blow in the circumferential direction on the male thread member 26 in the foreshortening direction of the screw-threaded members. Thereafter the engine valve having seated and the parts being relieved of axial thrust the torsion spring 28 tends to rotate the screw members in an opposite direction relative to each other to lengthen the linkage and take up any slack therein, that is until the cap 37 is stopped by the push rod or valve stem as the case may be which engages in the socket 38. In doing so the bottom end of the nut 27 will be engaged against the upper surface of the spring cap 50. The clearance coil spring 51, however, is of a strength to resist the effect of the torsion spring 28 and the cap 50 will remain in its upper position engaged against the sleeve 55 which position it assumed when the lobe of the cam rotated past the end of the tappet. The strength of the spring 51 will of course be much less than that of the poppet valve spring 15 and spring 51 readily compresses when the cam lobe rotates to a position for opening the poppet valve. This collapsing or compression of spring 51 an amount corresponding to the clearance 54 normally occurs during the opening ramp angle 60 of the cam before the poppet valve 14 starts to open. Similarly after the lobe passes the bottom of the tappet the clearance spring 51 becomes effective and moves the cap 50 up into engagement with the stop sleeve 52 during the period that the closing ramp angle 61 of the cam is in engagement with the bottom of the tappet. As indicated the spring 51 has ample strength, however, to resist any tendency of the coil spring 28 to move the cap member 50 downwardly. This is particularly so because the spring strength and the proportions of the elements are so made that for any normal setting of the clearance by the stop sleeve 52 the spring 51 will be under a substantial compression and pre-stressing.

The amount of the clearance will depend to a large extent upon the original design of the engine including the ratio between the lever arms on opposite sides of the fixed pivot of the overhead rocker arm 13 (Fig. 1) when an engine of that type is employed. As a typical case an engine may require a clearance of .024 inch which, in the type of engine shown in Fig. 1 where the rocker arm 13 is shorter on the tappet side by a ratio of for example 1 to 1.5, would require a clearance at the tappet side of about .016 inch. This is indicated on the cam in Fig. 2 at 62 and corresponds to the increase in radius from the base circle 56 at the opening and closing ramps. Some allowance, however, must normally be made for springiness in the linkage and the actual built in clearance, indicated at 54 in Fig. 2 would be reduced in the example given to about .014 or .015 inch.

It will be noted that the clearance or lift loss mechanism is substantially free of wear on its parts and also free of the effects of wear on other operating parts of the tappet such as the screw-threaded connection between the parts 26 and 27. The contacts of the cap member with the casing and the sleeve 52, it will be noted, are direct and comprise flat surfaces of considerable area which in addition may be of a material and heat treatment such as to be of high hardness. Wear of the spring 51 has no effect since it functions in any event to cause the cap member 50 to engage the ferrule or sleeve 52 and the clearance 54 remains the same. Variation in the force exerted by the torsion spring 28 has no effect because the spring 51 remains under adequate stress in its maximum extended condition to resist any force exerted by the torsion spring.

The assembly may be easily and accurately made. Initially the sleeve 52 is screwed down until the cap 50 strikes the bottom of the casing, and may then be retracted by a calibrated wrench the necessary amount to provide the desired and predetermined clearance 54, or the sleeve 52 may itself be suitably graduated. Thereafter the other elements are assembled in the casing, and may be removed for cleaning or repair without disturbing the setting of the clearance mechanism.

Figure 3:
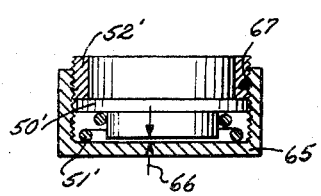
Fig. 3 is a small detail view of a capsule assembly of a clearance means similar to that shown in Fig. 2 but in a form adapted to be preadjusted and inserted as a unit in a tappet shell.

If desired the clearance mechanism may be made as a self-contained unit or capsule as shown in Fig. 3. In that arrangement the cap member 50', coil spring 51' and sleeve 52' are preassembled in a cup 65 with the sleeve accurately set to provide the desired clearance 66 and then secured in place as by spot welding at 67. The unit may then be inserted as a subassembly in the tappet shell for which it is designed.

Figure 4:
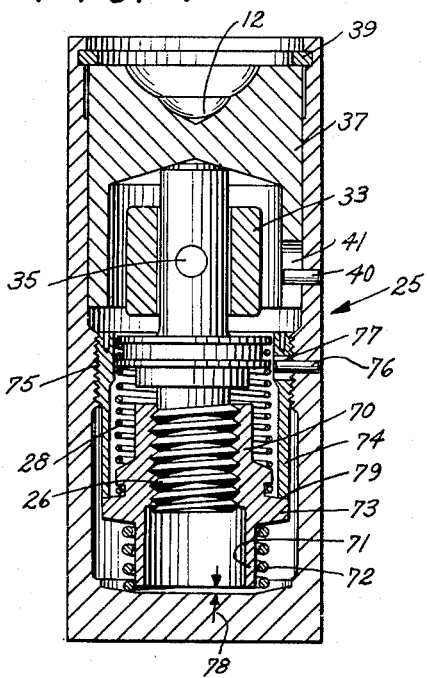
Fig. 4 is a vertical sectional view generally similar to that of Fig. 2 but showing a modified form of the clearance providing means.

In the form of Fig. 4 the casing, inertia means and other parts in the upper part of the casing are generally similar to those of Fig. 2 and bear similar reference characters. However, the clearance means and associated nut differ structurally from Fig. 2 and will be specifically described. The nut 70 has a downwardly extending cylindrical portion 71 which is encircled by the coil spring 72 maintained in compressed or pre-stressed condition between the bottom of the shell 25 and a flange 73 integral with the nut 70. An adjustable stop sleeve 74 for the clearance setting is threadably mounted in the interior of the shell as indicated at 75 and may be secured in adjusted position by any suitable means as by a pin 76 engageable in any one of a series of vertically elongated holes 77 extending around the periphery of the sleeve. The setting of the sleeve 74 determines the clearance 78 between the bottom end of the extension 71 and the interior face of the bottom of the shell. As the opening ramp of the operating cam rides along the bottom of the tappet 25, or some intervening tappet element in the linkage, the clearance 78 is closed up and appears at the point 79 between the stop sleeve 74 and the nut flange 73. As in the previous form the spring 72 is of course of less strength than the main valve spring but of sufficient strength and is in pre-stressed condition so as to resist any tendency to compress under the effect of the torsion spring 28. Like the form of Fig. 2 the mechanism is substantially free of changes in the clearance through wear or other factors.

Figure 5:
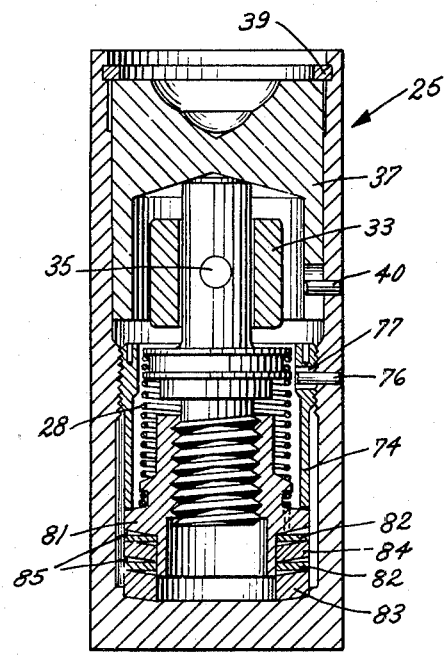
Fig. 5 is a vertical sectional view of a tappet embodying a spring clearance means utilizing flat spring washers.

Fig. 5 shows a tappet construction generally similar to that of Fig. 4, but embodying a different form of elastic spring means for the clearance feature. Elements like those in Fig. 4 bear the same reference characters. Between the flange 81 and the bottom of the shell are positioned a series of rings which may include one or more spring washers. Fig. 5 discloses two such spring washers 82 which as shown are generally flat in shape but may be of the dished or Belleville type. A filler ring 83 may be inserted in the bottom and a spacer ring 84 is positioned between the two spring washers 82. The bottom annular face of the nut flange 81, the upper and lower faces of the spacer ring 84, and the top face of the filler ring 83, are inclined radially and are parallel to each other in any vertical radial plane. When end thrust is applied to the bottom of the tappet body the spring washers collapse into engagement with the adjacent surfaces the clearance in this case being the sum of the spaces 85. As in the forms previously described the clearance spring means are chosen so that for any initial setting the springs are pre-stressed and partially collapsed and, although they may wear in use at their edges, as in some of the constructions heretofore employed in the prior art embodying spring washers, nevertheless in the present construction the wear is taken up by the pre-stressing or pre-compression, and the distance between the nut flange 81 and the filler ring 83 under high axial thrust and with the spring washers collapsed comprises the aggregate of the vertical thicknesses of the spacer 84 and the two spring washers 82. In other words for a given setting of the sleeve 74 the clearance will remain constant.

Figure 6:
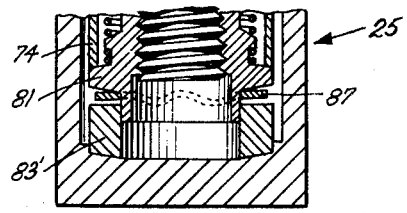
Fig. 6 is a fragmentary view of a tappet generally similar to that of Fig. 5 but employing a somewhat different form of spring washer.

Fig. 6 shows in a fragmentary manner a tappet similar to that of Fig. 5 but embodying a different type of spring washer 87 of wave form.

Figure 7:
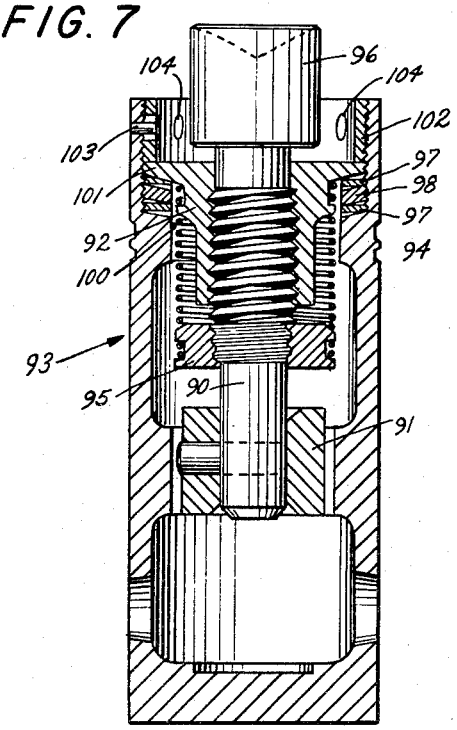
Fig. 7 is a vertical sectional view of a mechanical type tappet generally similar to that of Fig. 5 but with the inertia means located at the bottom of the screw and having the clearance means mounted at the upper end of the tappet shell.

Fig. 7 shows another form of automatic mechanical tappet which operates on the same principle as the others described herein and is quite similar in operation and elements to the tappet shown in Fig. 5 except the relative positions of certain elements are different. In Fig. 7 the screw stem 90 has the weight 91 mounted on the lower end thereof and the nut 92 is located in the upper part of the shell 93. The torsion spring 94 has its upper end fixed to the nut 92 in a well known manner and the lower end of the spring is secured to a ring 95 which in turn is rigidly secured to the screw 90, but the spring functions in the usual manner. The upper end of the screw has a head 96 with an upper socket adapted to receive therein the lower end of a linkage rod, or for example the valve stem, depending upon the type of engine and the particular location of the automatic tappet in the linkage. The elastic clearance means is similar in general to that shown in Fig. 5 except for the location and comprises two spring washers 97 and a spacer washer 98 positioned between an inner flange 100 of the casing 93 and a flange 101 integral with the nut 92. The adjustable sleeve 102 comprising the limiting stop for the clearance means is threadably mounted in the upper end of the housing 93 and may be secured in the adjusted set position by suitable means such as spot welding between the sleeve 102 and the outer shell 93, or by means of a locking pin as shown at 103 adapted to extend through to an opening in the shell 93 and into an appropriate one of a series of vertically elongated holes 104 extending around the periphery of the sleeve 102.

Further modifications in the construction and different embodiments of the invention could be made within the principles thereof, and it is intended that all matter contained in the above description or shown in the accompanying drawings shall be interpreted as illustrative and not in a limiting sense.

I claim:

1. In a length compensating mechanism adapted for longitudinal reciprocation in an end thrust transmitting linkage and having complemental members longitudinally adjustable automatically relative to each other in the operation of the linkage to take up the slack and said mechanism embodying an elastic clearance device collapsible under high end thrust in the linkage, said clearance device comprising an elastic means expansible in the longitudinal direction of the linkage arranged to press against one of said complemental members, and an adjustable stop means arranged to limit the movement of said one complemental member under the pressure of said elastic means.

2. In a length compensating mechanism adapted for longitudinal reciprocation in an end thrust transmitting linkage and having complemental members longitudinally adjustable automatically relative to each other in the operation of the linkage to take up the slack and said mechanism embodying a casing and an elastic clearance device therein collapsible under high end thrust in the linkage, said clearance device comprising an elastic expansible means mounted in compressed condition between a part of the casing and one of said complemental members and adapted to exert elastic pressure in the linkage lengthening direction, and an adjustable stop means arranged to limit the movement of said one complemental member under the pressure of said elastic means.

3. In a length compensating mechanism adapted for longitudianl reciprocation in an end thrust transmitting linkage and having a casing and means therein including a member movable longitudinally of the casing adjustable automatically in the operation of the linkage to take up the slack and said mechanism embodying an elastic clearance device mounted in said casing collapsible under high end thrust in the linkage, said clearance device comprising an expansible spring means, positioned between a normally fixed part of the casing and said member and adapted to exert spring pressure in the linkage lengthening direction, and an adjustable stop means arranged to limit the movement of said member in said casing under the pressure of said spring means.

4. In a length compensating mechanism adapted for longitudinal reciprocation in an end thrust transmitting linkage and having a casing and means therein including a member movable longitudinally of the casing adjustable automatically in the operation of the linkage to take up the slack and said mechanism embodying an elastic clearance device mounted in said casing collapsible under high end thrust in the linkage, said clearance device comprising an expansible spring means positioned between a normally fixed part of the casing and said member and adapted to exert spring pressure in the linkage lengthening direction, and a sleeve screw threaded in said casing and arranged to be engaged by said member and limit the movement of said member in said casing under the pressure of said spring means, said sleeve being adjustable thereby to determine the amount of the clearance.

5. In a length compensating mechanism adapted for longitudinal reciprocation in an end thrust transmitting linkage and having a casing and means therein including a member movable longitudinally of the casing adjustable automatically in the operation of the linkage to take up the slack and said mechanism embodying an elastic clearance device mounted in said casing collapsible under high end thrust in the linkage, said clearance device comprising an expansible spring means positioned between a normally fixed part of the casing and said member and adapted to exert spring pressure in the linkage lengthening direction, and an adjustable stop means arranged to limit the movement of said member in said casing under the pressure of said spring means, the stop means being positioned and so related to the spring means that the latter in its maximum permitted expansion is under elastic compression.

6. In a length compensating mechanism adapted for longitudinal reciprocation in an end thrust transmitting linkage of the character embodying a casing and a pair of members therein cooperatively threaded together and associated means automatically operated in the reciprocation of the mechanism to effect relative rotation between the members to take up the slack in the linkage and having an elastic clearance means mounted in the casing collapsible under relatively high end thrust in the linkage, said clearance means comprising an expansible spring means positioned between a normally fixed part of the casing and one of said members and adapted to exert elastic pressure on said one member tending to move it in the casing in the linkage lengthening direction, and a stop means adjustable in said casing and arranged to limit the movement of said one member in the casing under the elastic pressure of said spring means.

7. In a length compensating mechanism adapted for longitudinal reciprocation in an end thrust transmitting linkage of the character embodying a casing and a pair of members therein cooperatively threaded together and associated means automatically operated in the reciprocation of the mechanism to effect relative rotation between the members to take up the slack in the linkage and having an elastic clearance means mounted in the casing collapsible under relatively high end thrust in the linkage, said clearance means comprising an expansible spring means positioned between a normally fixed part of the casing and one of said members and adapted to exert elastic pressure on said one member tending to move it in the casing in the linkage lengthening direction, and a stop means adjustable in said casing and arranged to limit the movement of said one member in the casing under the elastic pressure of said spring means, the stop means being positioned and so related to the spring means that the latter in its maximum permitted expansion is under elastic compression.

8. In a length compensating mechanism adapted for longitudinal reciprocation in an end thrust transmitting linkage of the character embodying a casing and cooperative screw and nut members therein threaded together and associated means automatically operated in the reciprocation of the mechanism to effect relative rotation between the members to take up the slack in the linkage and having an elastic clearance means associated therewith mounted in the casing collapsible under relatively high end thrust in the linkage, said clearance means comprising a circular spring means mounted in elastically compressed condition between a fixed part of the casing and an element reciprocable in the casing with said nut member and adapted to exert spring pressure on the nut member tending to move it longitudinally of the casing, a sleeve screw threaded in the casing and arranged to limit the movement of said nut under the spring pressure, said sleeve being adjustable through said screw threaded connection thereby to determine the amount of clearance.

9. In a length compensating mechanism adapted for longitudinal reciprocation in an end thrust transmitting linkage of the character embodying a closed bottom casing and cooperative screw and nut members therein threaded together and associated means automatically operated in the reciprocation of the mechanism to effect relative rotation between the members to take up the slack in the linkage and having an elastic clearance means associated therewith mounted in the casing collapsible under relatively high end thrust in the linkage, the improvement wherein said clearance means comprises a thrust member mounted in said casing adjacent the bottom and adapted to be engaged by said nut, a clearance spring mounted between said member and the bottom wall of the casing, and a sleeve threaded within said casing and arranged to limit the upward movement of said member under the pressure of said spring adapted thereby to determine the amount of clearance between said member and the bottom of the casing when the mechanism is substantially free of end thrust, said spring being under substantial compression in its maximum permitted expansion.

10. In a length compensating mechanism adapted for longitudinal reciprocation in an end thrust transmitting linkage of the character embodying a closed bottom casing and cooperative screw and nut members therein threaded together and associated means automatically operated in the reciprocation of the mechanism to effect relative rotation between the members to take up the slack in the linkage and having an elastic clearance means associated therewith mounted in the casing collapsible under relatively high end thrust in the linkage, the improvement wherein said clearance means comprises a clearance spring interposed between said nut and the bottom of said casing and adapted to urge the nut upwardly from the bottom, said nut having an extension adapted to engage the bottom of the casing when said spring is sufficiently compressed, a stop sleeve adjustably threaded wtihin said casing and arranged to limit the upward movement of said nut and thereby the clearance space between the nut and the bottom of the casing in the position of maximum permitted expansion of said spring, the latter remaining under substantial compression in said position.

No references cited.